United States Patent
Westendorf

(10) Patent No.: US 7,496,573 B2
(45) Date of Patent: Feb. 24, 2009

(54) SYSTEMS AND METHODS FOR MODELING PROCESSING PROCEDURES

(75) Inventor: Frank Westendorf, Ubstadt-Weiher (DE)

(73) Assignee: SAP AG, Walldorf (DE)

( * ) Notice: Subject to any disclaimer, the term of this patent is extended or adjusted under 35 U.S.C. 154(b) by 343 days.

(21) Appl. No.: 11/523,007

(22) Filed: Sep. 19, 2006

(65) Prior Publication Data

US 2007/0078867 A1 Apr. 5, 2007

Related U.S. Application Data

(60) Provisional application No. 60/717,739, filed on Sep. 19, 2005.

(51) Int. Cl.
*G06F 7/00* (2006.01)
*G06F 17/30* (2006.01)

(52) U.S. Cl. .................................... 707/7; 707/8; 707/9

(58) Field of Classification Search ........................ None
See application file for complete search history.

(56) References Cited

U.S. PATENT DOCUMENTS 5,129,083 A 7/1992 Cutler et al.
5,181,162 A * 1/1993 Smith et al. .................. 715/209
5,819,279 A 10/1998 Togawa
6,640,244 B1 * 10/2003 Bowman-Amuah ......... 709/207

OTHER PUBLICATIONS

Communication from the European Patent Office in Application No. 06019150.9, dated Oct. 26, 2007 (3 pages).

* cited by examiner

*Primary Examiner*—Jean M Corrielus
*Assistant Examiner*—Angelica Ruiz
(74) *Attorney, Agent, or Firm*—Finnegan, Henderson, Farabow, Garrett & Dunner, LLP

(57) ABSTRACT

Systems and methods are provided for implementation of a processing procedure on an object allocated to an object category as an instance of an object type. In one embodiment, a computerized method is provided. The method may include breaking the object into separately processable, hierarchically classifiable sub-objects as instances of corresponding sub-object types, processing at least a part of the sub-objects with respective predetermined partial processing procedures specific to each sub-object type. The method may further include processing results obtained from processing the sub-objects and combining the results via a functional relationship in a processing procedure of higher rank than the partial processing procedures. An object-specific processing result may then be derived for the processing procedure.

17 Claims, 6 Drawing Sheets

SYSTEMS AND METHODS FOR MODELING PROCESSING PROCEDURES

RELATED APPLICATIONS

This application claims the benefit of priority from U.S. Provisional Application No. 60/717,739, entitled "Method of Modeling From a Process," filed Sep. 19, 2005, the disclosure of which is expressly incorporated herein by reference in its entirety.

BACKGROUND

1. Technical Field

The present invention generally relates to the field of data processing and to computerized systems and methods for modeling processing procedures on business objects. More particularly, and without limitation, the invention relates to methods and systems for implementing a processing procedure on, for example, a complex business object without a process modeler having to master and/or use a technical modeling component.

2. Background Information

Business objects are hierarchically organized and complex structures that include components that may have widely varying types of properties. For this reason, data that is required in order to adequately describe a business object can be very large. Moreover, calculations that have to be carried out and that are based on information included in the data are very complex and time-consuming.

In most cases, properties of hierarchically classifiable components of a higher-ranking business object are in each case specializations of properties of correspondingly higher-ranking components, from which their respective value can be derived with a high degree of probability directly or at least explicitly from the value of the correspondingly higher-ranking components. Storage of this information in a complete data model requires a great deal of storage space and time. Calculations that are to be carried out on business objects, such as estimates, evaluations, or price determinations in which the business object itself is one of the complex business models described above, are generally complex and time-consuming. In particular, calculation mechanisms are based on a global calculation approach, in which all necessary information must provide a transparent method of calculation. However, such mechanisms often involve redundant calculation steps.

In addition, at component interfaces, an information requirement of a processing component is, as a rule, not known. Consequently, the component that requires a corresponding service and/or addresses a processing component is not able to file all the data at the optimum location for the processing, but is limited to supplying its state of knowledge as completely as possible but in a redundant-free manner.

Accordingly, systems and methods disclosed herein are directing to overcoming one or more of the above-referenced problems.

SUMMARY

Consistent with an embodiment of the present invention, a computerized method is provided for implementation of a processing procedure on an object allocated to an object category, as instance of an object type in a computer system. The object may be broken down into separately processable, hierarchically classifiable sub-objects as instances of corresponding sub-object types. At least some of the sub-objects may be processed with respective predetermined partial processing procedures specific to each sub-object type. Sub-object specific processing results that are obtained may be made available and combined via a functional relationship in a processing procedure of higher rank than the partial processing procedures. Thereafter, an object-specific processing result for the processing procedure may be derived. To implement the partial processing procedures specific to each sub-object type, object attributes or attributes of other sub-objects, in particular hierarchically higher-ranking sub-objects, may be temporarily provided and employed.

Due to the breakdown of the object into separately processable, hierarchically classifiable sub-objects, specific object properties can be allocated to corresponding sub-objects, so that a redundancy with respect to the object properties can be avoided. Additionally, or alternatively, by means of such a breakdown, it is possible to define and predetermine for each sub-object as an instance of a corresponding sub-object type, one or more partial processing procedures specific to the sub-object type, which on account of the fact that it operates only on a sub-object is far less complex than a global processing procedure to be carried out on the higher-ranking object. In order to implement the respective partial processing procedures specific to each sub-object type, object attributes or attributes of other sub-objects may be provided temporarily in each case. Further, particular attributes of higher-ranking sub-objects it is now envisaged to provide temporarily in each case provided for those sub-objects that are hierarchically subordinate to them.

Consistent with one embodiment, a temporary storage structure and/or a non-permanent object type for the temporary provision of the object attributes and/or attributes of hierarchically higher-ranking sub-objects may be generated. The attributes are temporary filed and can be transferred to the corresponding partial processing procedures specific to the sub-object type. Process-specific rules can be appropriately predetermined in each case for a partial processing procedure specific to the sub-object type, according to which attributes of higher-ranking sub-objects or object attributes are used, and are correspondingly passed on or transmitted as such. An implementation of such a temporary rule-based transmission of attributes from higher-ranking sub-objects to correspondingly subordinate sub-objects is associated with a high potential for saving, both as regards the required processing time as well as the required storage space within the computer system. Accordingly, process-relevant attributes, on the part of a process component can be targeted and by means of simple, quick rules made available in a redundant manner at the correct time to the corresponding partial processing procedures, without the process modeler having to use a technical implementation layer for this purpose.

In accordance with another embodiment, a temporarily generated storage structure and/or the non-permanent object type may be provided with attributes required for the implementation of a corresponding partial processing procedure specific to the sub-object type. In addition, a further saving in storage space can be achieved. The temporarily generated storage structure may nevertheless have a structure or mask that can be generalized, so that it can be generally used for a temporary transmission of attributes, and from case to case is occupied with various attributes only depending on the partial processing procedures specific to the sub-object type.

According to another embodiment, a method is provided for implementation of a processing procedure on a business object in order to break the business object into partial processing procedures on corresponding sub-objects of the business object that are to be carried out independently of one another. Corresponding processing results are in turn cumulatively compiled in order to obtain an overall result. Accordingly, each sub-object may be associated as an instance of a sub-object type with reusable partial processing procedures specific to the sub-object type, which as a rule are greatly simplified compared to a higher-ranking overall processing procedure. Furthermore, a sub-object type can correspondingly be associated with one or more types of partial processing procedures specific to the sub-object type. Due to the breakdown of the business object into sub-objects, on which the corresponding partial processing procedures specific to the sub-object type can be carried out, a minimization of redundant calculations is also achieved.

In yet another embodiment, the object as well as the sub-objects of the object are each represented and instantiated in one or more databanks of the computer system by one or more hierarchically classifiable directories specific to the object type and sub-object type. Furthermore, the directory or directories is/are in each case structured in a generalized manner, i.e., the respective mask of the directory or directories is not specific to exactly one object or one sub-object. The partial processing procedures may be transferred to the sub-objects that are specific to the sub-object type, via correspondingly implemented interfaces to external processing units, such as computer units, for example.

To implement partial processing procedures specific to the sub-object type, intermediate processing results may be provided. These results may for example be processing results of completed partial processing procedures of subordinate sub-objects. Accordingly, the hierarchical structure of the object into sub-objects may be transferred from the top down and made available. Furthermore, processing results of partial processing procedures are passed on from the bottom up, where they are made available for further processing. This can likewise be initiated automatically.

In another embodiment, a business object may be made available to an external processing business application via an interface without the need to transmit a large volume of data. On account of the temporary, in particular rule-based provision of attributes for the implementation of partial processing procedures specific to the sub-object type, it may not be necessary for these attributes to be made permanently available, so that the data load to be provided via a corresponding interface can be kept small.

In one embodiment, the business object may be made available to a processing component or business application via a corresponding interface for the handling and/or processing of for example a partial processing procedure. Accordingly, it is not necessary to allocate to the sub-object to be processed, already at the interface, all the attributes required for the implementation of the partial processing procedure, and thus to transfer a large data load at the interface. The required attributes may instead be temporarily provided automatically, in particular in a process-specific, process step-specific and/or transaction-specific manner, in the processing according to implemented rules. Processing component may need to have information on which attributes are required for which of the processing procedures to be carried out by it. Accordingly, when transferring a business object to a processing business application or a processing component no knowledge needs to be made available at the corresponding interface, such as for example when which attributes have to be provided for implementing which processing or partial processing procedure. Attributes need to be provided in just as small amount in a redundant manner in order thereby to ensure that in all cases all attributes are allocated to each sub-object, irrespective of whether a processing of the sub-object requires the attributes at all. Furthermore, transmission rules, according to which attributes are provided, are predefined and implemented. When implementing a partial processing procedure specific to a sub-object type within the framework of the implementation of a processing procedure of a business sub-object, the corresponding attributes are automatically temporarily transferred, according to the implemented transmission rules, to the corresponding partial processing procedure and made available.

Furthermore, it is conceivable to file the partial processing procedures specific to a sub-object type in a form of library so that they can easily be retrieved and reused. According to such a scheme, for each hierarchy stage within a hierarchically broken down object or object type, partial processing procedures or types of partial processing procedures can be filed in a library and can be made retrievable. A processing procedure on a business object is accordingly realized by an aggregation of hierarchically classifiable partial processing procedures on corresponding hierarchically classified sub-objects.

In one embodiment, a "father-child" model as regards to the object type may be employed in the process and based on a directed network. The correspondingly hierarchically constructed model associated therewith of corresponding calculations and processing procedures is therefore also directed. The processing sequence can be specified from the beginning and higher-ranking processing procedures and calculations may, being aggregations, use the processing results of subordinate processing procedures and calculations. In this connection, a higher-ranking object may only use the processing results of sub-objects that are subordinate to it. Accordingly, higher-ranking partial processing procedures and/or calculations may obtain their context from their respective associated object or sub-object.

For an object type, there are simple partial processing procedures specific to the sub-object type, as well as complex types of partial processing procedures that are based on the simpler types. In this case, a processing procedure hierarchy for an object or sub-object is established that permits an efficient reutilization of a corresponding processing procedure library.

In accordance with another embodiment, a system may be provided for managing objects and implementing at least one processing procedure on at least one of the objects allocated in each case to an object category. The object may be filed as an instance of an object type into separately processable and hierarchically organized sub-objects as instances of corresponding sub-object types and filed in a memory unit. In addition, at least one processing unit may be made available, in which there are provided partial processing procedures specific to each sub-object type, with which at least some of the sub-objects can be processed. The results of processing the sub-object types may be combined via a functional relationship in a processing procedure that is higher ranking than the partial processing procedures. From this a processing result specific to the sub-object type can be derived for the processing procedure. In addition, the system may comprise a control unit that is suitable or designed to make available, temporarily in each case, object attributes and/or attributes of other sub-objects, such as hierarchically correspondingly higher-ranking sub-objects, for the implementation of the partial processing procedures specific to the sub-object type.

According to one embodiment, the system may include a control unit that generates, for the temporary provision of the attributes of the object or other, hierarchically higher-ranking, sub-objects for the corresponding sub-objects. Furthermore, the system may include a temporary storage structure or a non-permanent object type, in which the attributes can be temporarily filed and transferred to the corresponding partial processing procedures specific to the sub-object type.

In accordance with another embodiment, in a system according to the invention, an object and associated sub-objects are in each case represented, filed and therethrough instantiated in one or more databanks by one or more hierarchically classifiable directories specific to the object type or sub-object type. In this case, the directory or directories are in each case structured in a generalized manner, i.e., they include for example a mask that can be employed for the various types of object, in particular types of objects of a hierarchy level.

In another embodiment, the sub-objects and specific to the sub-object type can be transferred for implementation to external processing units, in particular computer units.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

Figure 1:
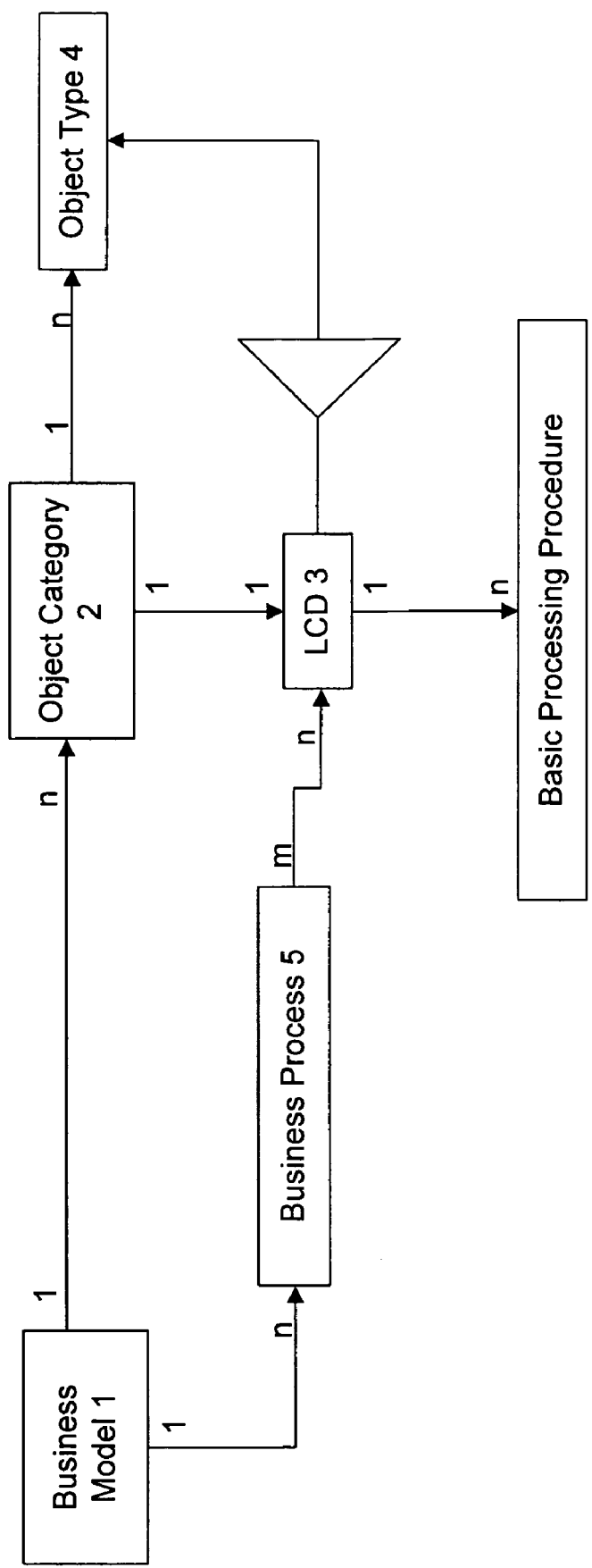
FIG. 1 is a diagram of an exemplary model, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

FIG. 1 is a diagram representing an exemplary structuring of a business object, consistent with an embodiment of the present invention. A basic business model 1, which may, for example, be a model for specifying and processing target agreements, is subdivided into several, for example n, so-called object categories 2. This is clarified in FIG. 1 by corresponding labeling of the arrow connecting the business model 1 and the object category 2. An abstract target or a type of target as a logical definition of an abstract target, which could for example be defined by a business or enterprise, forms an object category 2. To each object category 2, there are moreover allocated several, for example n, object types 4, which in turn are associated with a specific type of target, of which the abstract target or the type of target predetermined by the object category 2 can be composed. The structure illustrated here is based on the assumption that the types of object 4 represented in the object category 2 can be reduced to a common higher-ranking object type 3 that comprises all common features of the types of object 4 represented in the category 2. In this connection, one speaks of a "lowest common denominator (LCD)" of the object types 4. The object types 4 themselves differ as regards further specific properties. Accordingly, for the higher-ranking common object type 3 that comprises all common properties of the object types 4 represented in the category, there already exists a given databank model as well as several, for example n, basic processing procedures 6, such as for example storage, reading and deletion. In addition, a generalized business transaction model forms the basis according to which all, for example n, business processes 5 allocated to this business model 1 run according to business rules. For example, m business processes 5 may be used for n such LCDs 3 of object types 4. Since the object types 4 are subordinate types of target, they may be elementary of complex targets. Each complex type of target may be composed of arbitrarily many other, already defined, types of target. The nesting depth is in this connection arbitrary, though as a rule may be limited. For elementary targets, target achievement grades can be determined from target values, actual values and corrected values, directly for instance in the aforementioned example of target agreements. Based on this, a target achievement grade of the higher-ranking type of target 3 can then, for example, be determined, and in addition for example a remuneration to be paid can then be specified according to defined business processes 5.

Figure 2:
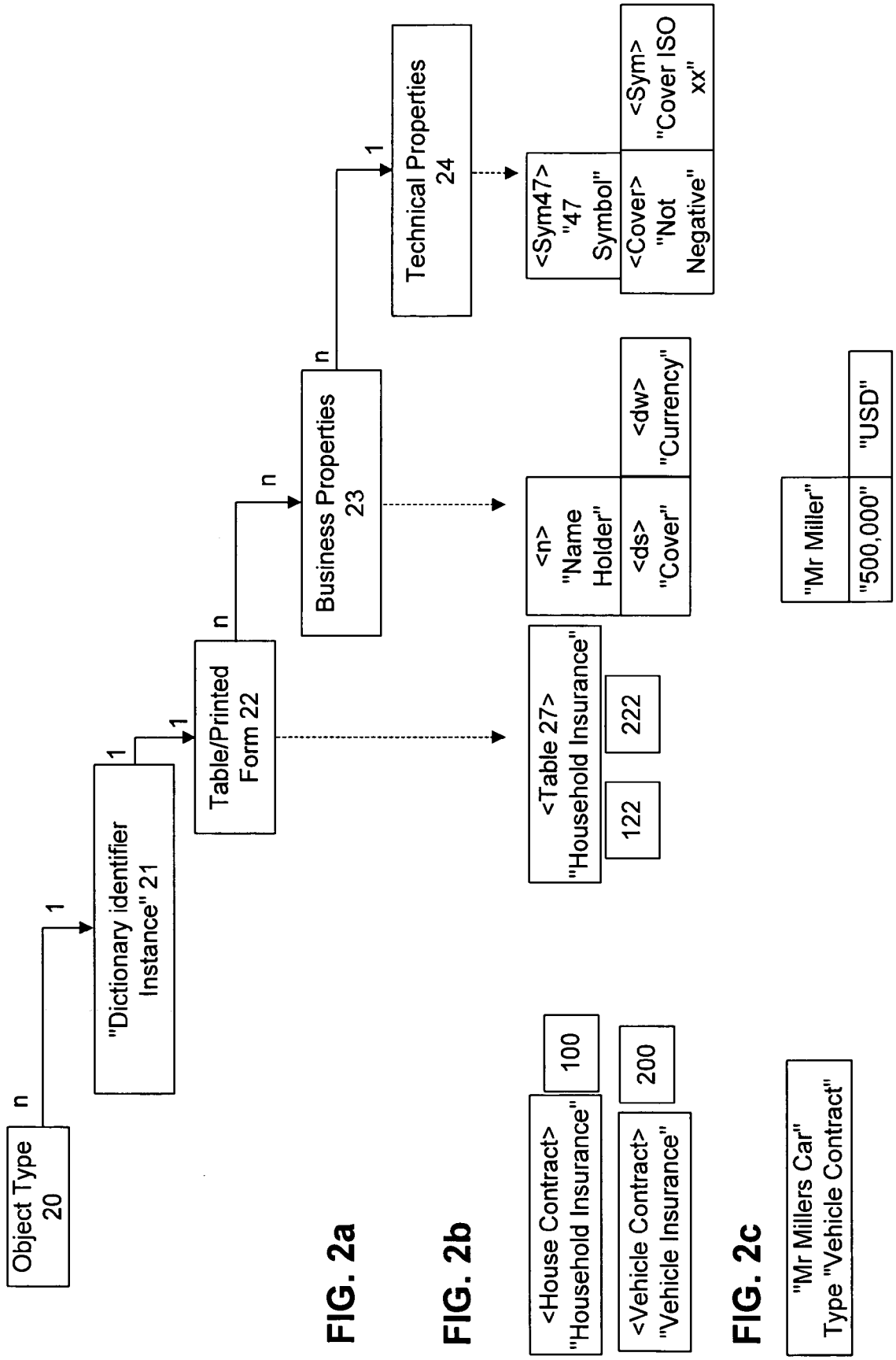
FIGS. 2a-2c are diagrams of an exemplary object type and an object, consistent with an embodiment of the present invention.

FIG. 2a is an exemplary representation of an object type, such as can be filed and instantiated as an object by allocating specific values, consistent with an embodiment of the present invention. A global identification or structure 21, which is termed a "dictionary instance identifier," may be allocated to an object type 20. This identification or structure 21 is characterized by an identification number. In addition, this identification or structure 21 can in turn be represented in the form of a table or a printed form 22. The respective entries in the tables or forms are determined via business properties 23 and via technical properties 24.

FIG. 2b is a diagram of an exemplary instantiation, still to be realized, of an object type 20 illustrated in FIG. 2a, consistent with an embodiment of the present invention. In this case, object type 20 may for example be an insurance contract. Object type 20 may in this connection for example be instantiated as a household insurance contract 100 or a vehicle insurance contract 200. The corresponding insurance contract, whether it be the household insurance contract 122 or the vehicle insurance contract 222, is then filed in a structure 21 associated therewith in a table 22 associated with the object type 20. The correspondingly filed business properties 23 then include for example the insurer and/or insured party, the insured sum as well as the appropriate currency, which is shown by the dotted arrow. Corresponding technical data 24 are then allocated to the corresponding business properties, which is again illustrated by a dotted arrow.

FIG. 2c is an exemplary object as an instance of a vehicle insurance contract, consistent with an embodiment of the present invention. The object is in this case identified as "Mr. Miller's car." As business properties 23 associated therewith, Mr. Miller is entered as the insured party, "500000" as the sum insured, and "USD" as the currency.

Figure 3:
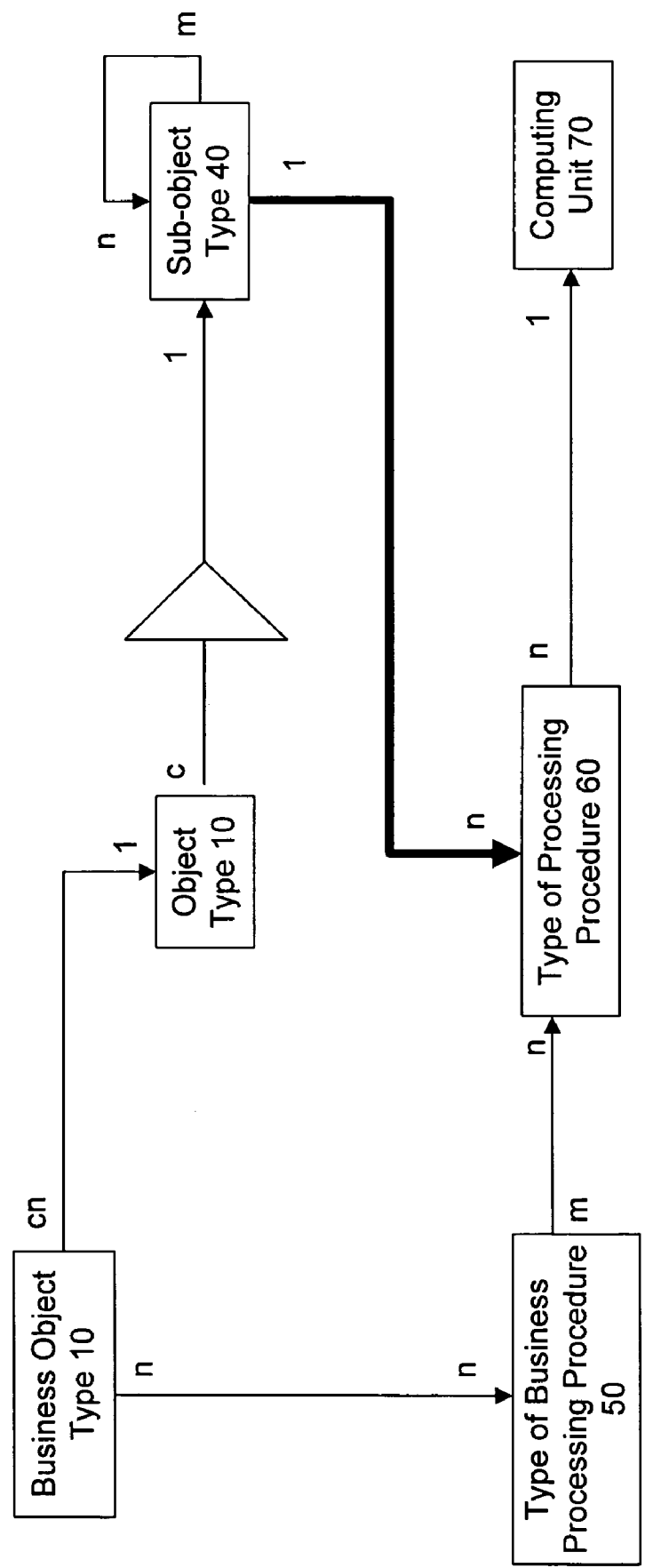
FIG. 3 is a diagram of an exemplary structure of an object type including associated types of processing procedures, consistent with an embodiment of the present invention.

FIG. 3 is a diagram of an exemplary subdivision of an object type 20 associated with a type of business object 10, and a corresponding subdivision of types of processing procedures 60 associated therewith. A complex object type 20 can as a rule be broken down into sub-object types 40, which in turn can be hierarchically arranged so that a respective father-child relationship, as is illustrated by a return arrow, is formed among these sub-object types 40. One or more types of partial processing procedures 60 may be allocated to each sub-object type 40. These types of partial processing procedures 60 may in turn be transferred via correspondingly implemented interfaces to one or more external processing units 70 for implementation. A type of processing procedure 50 associated with the type of business object 10 may in turn be associated with the various types of partial processing procedures 60 in such a way that, in the implementation, the corresponding partial processing results produce via a functional relationship a processing procedure result specific to the business object, for the corresponding processing procedure 50. In this connection, it is also conceivable for several, for example m, business processing procedures to be associated with in each case several, for example n, partial processing procedures 60, i.e. to use in each case partial processing results obtained therefrom. The object type 20 is thus broken down into separately processable, hierarchically classifiable sub-object types 40, in which at least some of the sub-object types 40 can be associated with respective predetermined types of partial processing procedures 60 specific to the sub-object type, with the aid of which correspondingly instantiated sub-object types 40 can be processed. The processing and/or the implementation of the corresponding partial processing procedures 60 may take place via one or more external computing units 70. Processing results obtained therefrom and specific to the sub-object are in turn made available and combined via a functional relationship in a processing procedure ranking higher than the partial processing procedures 60, and from this an object-specific processing result for the processing procedure 50 is derived. In order to implement the partial processing procedures 60 specific to the sub-object type, preferably rule-based attributes of hierarchically higher-ranking instantiated sub-object types 40 and/or attributes of the higher-ranking instantiated object type 20 are in each case temporarily made available. In each case, a temporary storage structure or a non-permanent object type is generated for the temporary provision of the aforementioned attributes for the instantiated sub-object types 40 to be correspondingly processed, in which the attributes are temporarily filed and transferred to the corresponding partial processing procedures 60 specific to the sub-object type.

Figure 4A:
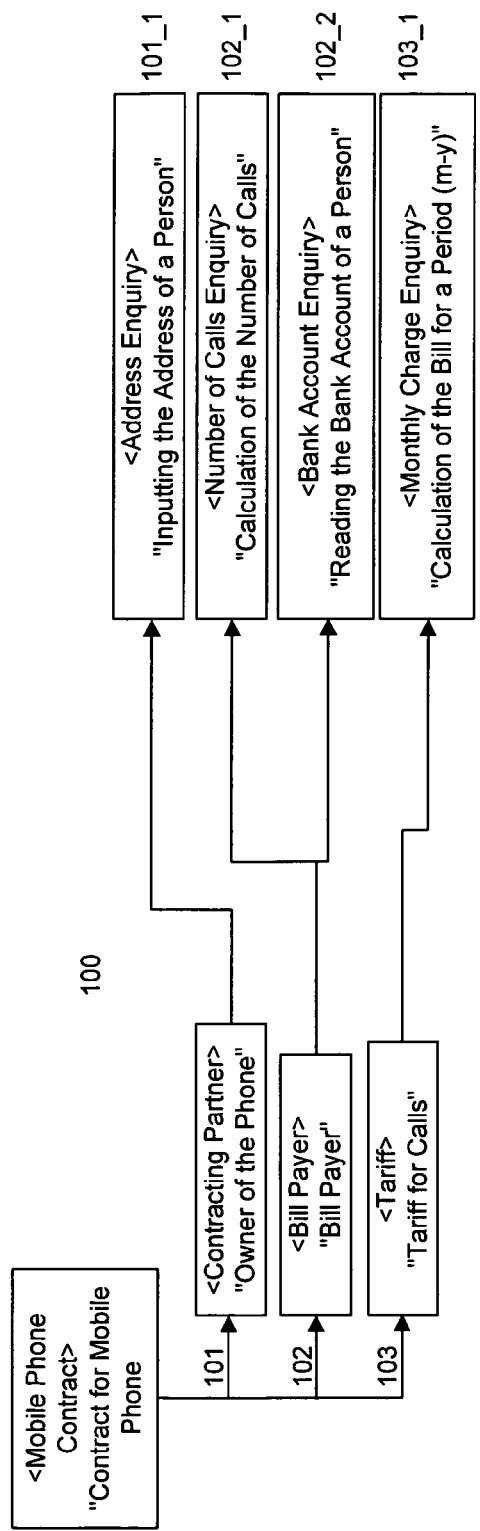
FIGS. 4a and 4b are diagrams of an exemplary process of breaking down an object type into types of sub-objects, consistent with an embodiment of the present invention.
Figure 4B:
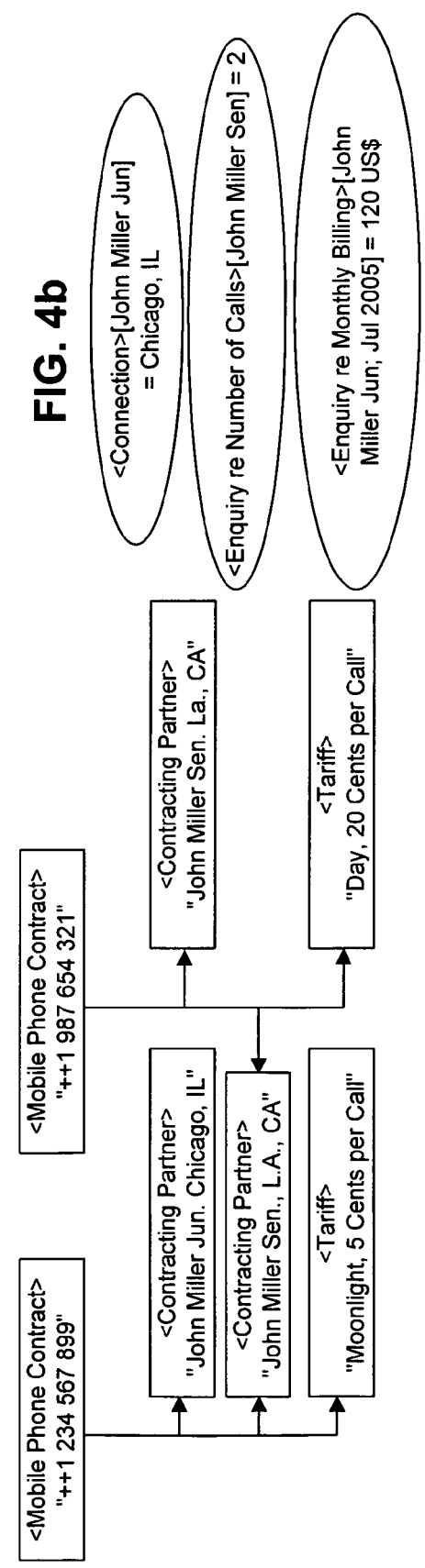

FIGS. 4a-4b illustrate an exemplary breakdown of an object type into corresponding sub-object types, which in turn are associated with one or more types of partial processing procedures specific to the sub-object type, consistent with an embodiment of the present invention. In this example, the object type is a mobile phone contract. As shown in FIG. 4a, the object type may be broken down into three sub-object types, namely a contracting party 101, i.e., a person for whom the contract is concluded, a person 102 who settles the accounts associated with the contract, and a tariff 103 specified in writing in the contract. Each of these sub-object types 101, 102, 103 can now be associated with one or more types of processing procedures specific to the sub-object type. Thus, for example, in the case illustrated here the sub-object type 101, namely "Contracting Party," may be coupled to a type of processing procedure 101_1 for ascertaining the address associated with the said contracting party. The sub-object type 102, namely "Bill Payer" may in the case illustrated here be associated for example with two different types of processing procedures 102_1 and 102_2 specific to the sub-object type. For example, this may be a type of processing procedure 102_1 by means of which the number of telephone calls made can be determined and furthermore may involve a type of processing procedure 102_2 independent thereof, by processing procedures specific to the sub-object type correspondingly associated with the sub-object types, a complex enquiry becomes a set of several individual simple processing procedures that can be carried out independently of one another. In addition, it is possible, as illustrated in FIG. 4b, for individual sub-objects to be allocated to several of objects, whereby storage resources can be saved. The structure of an object type illustrated here and types of processing procedures associated therewith shows that generic object types and/or sub-object types and types of processing procedures or types of partial processing procedures associated therewith can be reused without additional implementability.

Figure 5:
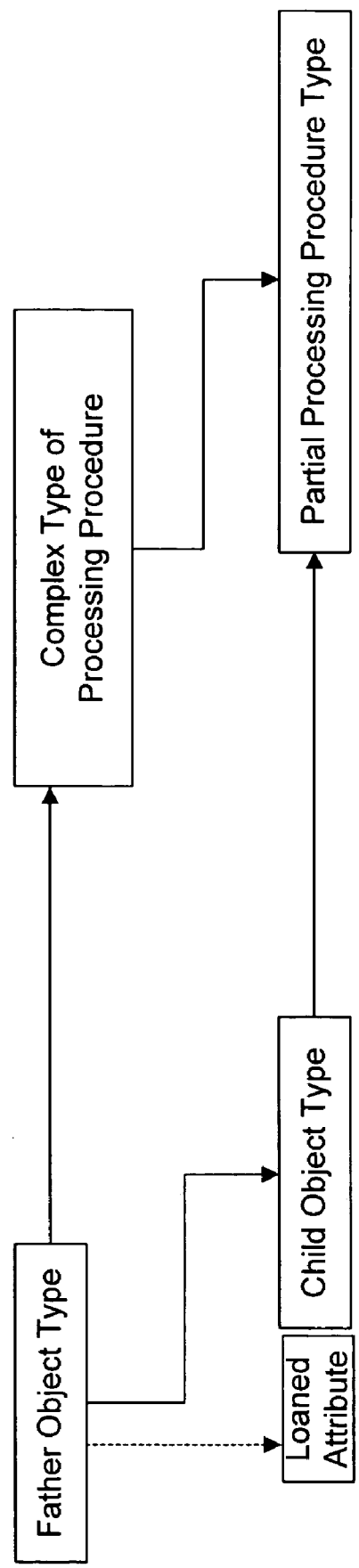
FIG. 5 is a diagram of an exemplary structure of an object type, consistent with an embodiment of the present invention.

FIG. 5 is a diagram of an exemplary hierarchical subdivision of an object type into a higher-ranking object type, a so-called "father" object type, and a sub-object type subordinate thereto, a so-called "child" object type. When carrying out partial processing procedures specific to the sub-object type and associated with the corresponding sub-object, it is often necessary to make properties of the higher-ranking object available to the corresponding partial processing procedure. In this connection, it is possible to file such properties permanently together with the sub-object so that the properties and attributes are always available for the processing of the corresponding sub-object. However, this approach is associated with a large necessary storage capacity. In order to avoid this, it may be envisaged that corresponding attributes of the higher-ranking object be made available only temporarily to the sub-object when carrying out corresponding partial processing procedures. To this end a new storage structure is temporarily generated, in which attributes of the higher-ranking object are filed as "loaned attributes" preferably in a rule-based manner automatically when implementing a corresponding partial processing procedure on the sub-object, and are thus made available to the partial processing procedure. In this connection, it may be envisaged that in general all available attributes of the higher-ranking object or objects are temporarily made available to a sub-object, or only the attributes of the higher-ranking objects that are necessary for the implementation of the corresponding partial processing procedure can be made available selectively. Due to such a temporary provision of attributes of higher-ranking objects, storage space can be saved and the corresponding object can be made available to various applications via implemented interfaces without a large amount of data together with the object having had to be transferred.

Figure 6A:
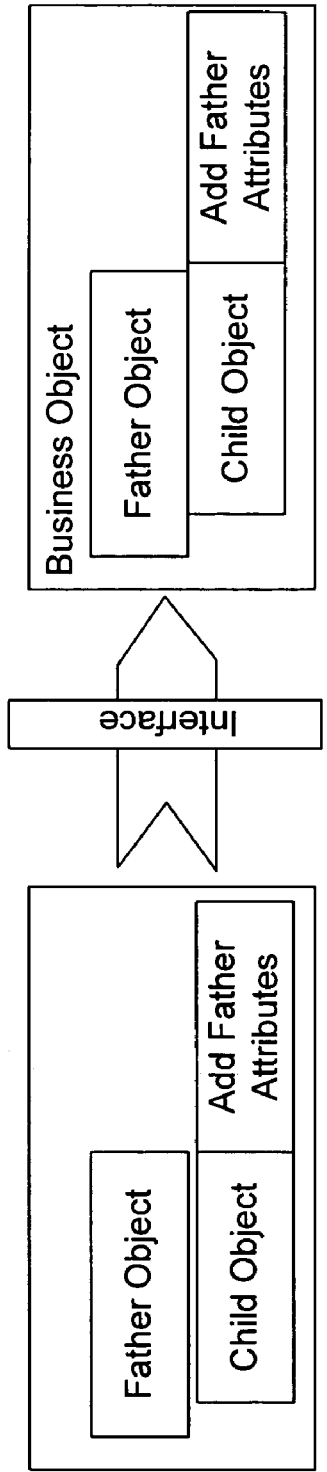
FIGS. 6a and 6b are diagrams of exemplary scenarios, consistent with embodiments of the present invention.

FIG. 6a shows an exemplary business object that may be made available by business application 1 via an interface or via an interface of business application 2, consistent with an embodiment of the present invention. The business object is hierarchically structured and broken down into a father object and a child object subordinate thereto. The business application 2 may be a processing application that can carry out one or more processing procedures on the business object. Since it is possible that, as already explained, when processing the child object attributes allocated to the father object are required, these attributes are allocated constantly, i.e., permanently, also to the child object and are thus filed in a redundant manner. In this way, on the one hand storage space is permanently occupied, and on the other hand, it is necessary to provide a large volume of data at the interface. Since the business object 1 has no knowledge of which attributes of the father object are required to implement, a partial processing procedure on the child object through the business application 2, all attributes of the father object are also permanently allocated to the child object which, as already mentioned, leads to an unnecessarily high volume of data for the business application 1.

Figure 6B:
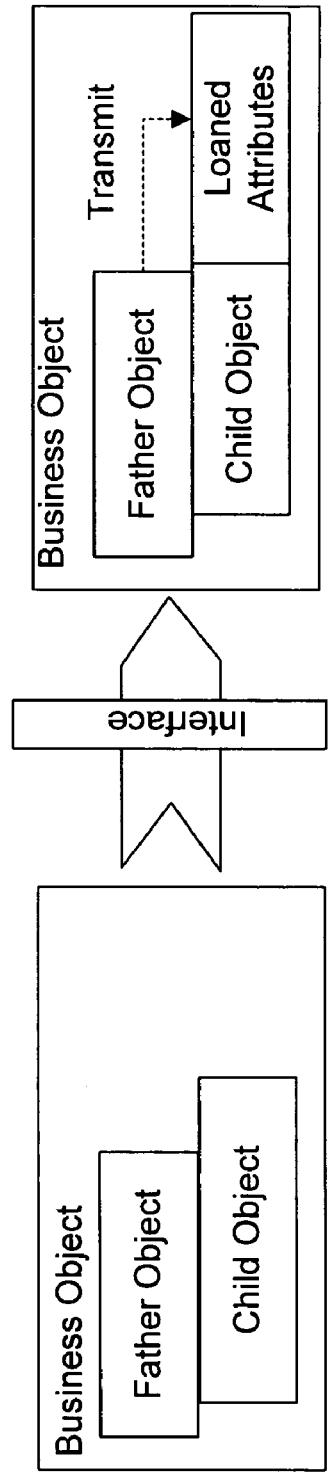

FIG. 6b is a diagram of an alternative business object that enables the business object at an interface to be made available by business application 1 to business application 2, consistent with an embodiment of the present invention. As in FIG. 6a, the business object is hierarchically structured and is broken down into a father object and a child object is subordinate. The business application 2 may yet again be a processing application that can carry out one or more processing procedures on the business object. If now the business application 1 makes the business object available to the business application 2 via the interface, then the attributes of the father object are not already "prophylactically" allocated to the child object for the case where these are required in a processing procedure of the child object to be carried out on the part of the business application 2. When carrying out a processing procedure on the child object on the part of the business application 2, a temporary storage structure or a non-permanent object type is instead generated, where the attributes of the father object are filed and can thus temporarily be made available for the implementation of the processing procedure on the child object. For example, either all attributes of the father object may be filed, or only those attributes of the father object that are required for the implementation of the processing procedure. This can be controlled via transmission rules, which can be defined and implemented. How the rules are to be defined, i.e., what limits or conditions have to be taken into account, can in this connection be predetermined specifically according to the application. In contrast to the scenario shown in FIG. 6a, in the scenario shown in FIG. 6b, unnecessarily large volumes of data are not available at the interface. Furthermore, the redundant filing of permanent data that takes up an unnecessarily large amount of storage space is avoided.

In the already mentioned field of target agreements, it is for example possible for an insurance company to define in abstract form for all its general agencies an abstract target for a business year. The abstract target then forms, in the wording of the present disclosure, an object category. The abstract target may for example be given by:

(1) Setting a production value for a new business in the "health insurance" sector;
(2) Setting a production value for an expanding business in the "life assurance" sector;
(3) Weighting the target achievement grade "expanding business life assurance" by a figure of 75%; and/or
(4) Weighting the target achievement grade of the "new business health insurance" by a figure of 25%.

In order to determine a target achievement grade of the complex target defined by the abstract target, first of all the target achievement grade of subordinate targets that are to be termed sub-objects within the context of the present disclosure, may be determined. The sub-objects correspond in the aforementioned example to the targets that are specified on the one hand for the "life assurance" sector and on the other hand for the "health insurance" sector. The target achievement grades of these targets and sub-objects are combined logically and mathematically with one another by means of weighting and aggregation, to determine the target achievement grade of the higher-ranking target. An appropriate reward on the basis of the target achievement grade of the complex higher-ranking target is regulated at the level of the complex target. In order to determine the respective target achievement grades in the subordinate targets, i.e., in the sub-objects, it is possible that attributes of the higher-ranking target are temporarily required, such as for example data from a clerk, with which the target agreement was met. When determining the target achievement grades of the sub-objects, further attributes that are coupled to the corresponding clerk and that are valid for both sub-objects, may be necessary. For this purpose, these attributes are, as already mentioned, made available temporarily. If for example it is now found that the target achievement grade in the "life assurance" sector is 120% and the target achievement grade in the "health insurance" sector is 100%, then by combination and weighting as specified in the abstract target, an overall target achievement of 115% is obtained. This target achievement grade of 115% is now the basis on which further calculations, for example as regards a reward for the clerk, can be made. In this example, it can once again be clearly shown how an object can be broken down into separately processable, hierarchically classifiable sub-objects, and how the sub-objects are processed using the respective predetermined partial processing procedures specific to the sub-object type, wherein sub-object-specific processing results obtained therefrom are combined via a functional relationship in a higher-ranking processing procedure, and from this an object-specific processing result for the processing procedure can be derived. In order to carry out the partial processing procedures specific to the sub-object type, in each case there are temporarily provided rule-based attributes of the hierarchically higher-ranking object or of hierarchically higher-ranking sub-objects.

The foregoing description has been presented for purposes of illustration. It is not exhaustive and does not limit the invention to the precise forms or embodiments disclosed herein. Modifications and adaptations of the invention will be apparent to those skilled in the art from consideration of the specification and practice of the disclosed embodiments of the invention. Further, computer programs based on the present disclosure and methods consistent with the present invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method for implementing of a processing procedure on an object allocated to an object category as an instance of an object type in a computer system, comprising the steps of:
   parsing the object into separately processable, hierarchically classifiable sub-objects that are instances of corresponding sub-object types;
   processing at least some of the sub-objects with, predetermined partial processing procedures that are specific to each sub-object type, wherein attributes of the sub-objects or attributes of other sub-objects are temporarily made available during the predetermined partial processing procedures, the attributes of the other sub-objects being attributes of hierarchically higher-ranking sub-objects;
   processing results obtained from processing the sub-objects and combining the results using a functional relationship in a processing procedure of a higher rank than the predetermined partial processing procedures; and
   deriving an object-specific processing result from the processing procedure,
   wherein the object and the sub-objects of the object are instantiated in one or more databanks of the computer system and are stored in one or more hierarchically classified directories specific to the object type or sub-object type, and further wherein the directory or directories are in each case structured such that a mask of the directory or directories is not specific to the object or one of the sub-objects.

2. The method of claim 1, wherein a temporary storage structure or a non-permanent object type is stores the attributes for the corresponding sub-objects to be processed, in which attributes are temporarily filed and transferred to the corresponding partial processing procedures specific to each sub-object type.

3. The method of claim 2, wherein the temporary storage structure or the non-permanent object type is provided with the attributes that are required for carrying out a corresponding partial processing procedure specific to the sub-object type.

4. The method of claim 2, wherein the attributes are automatically made available according to predefined rules implemented in the computer system.

5. The method of claim 1, wherein the partial processing procedures specific to the sub-object types are transferred via an interface to external processing units.

6. The method of claim 1, wherein intermediate processing results of correspondingly subordinate sub-objects are temporarily made available for the implementation of the partial processing procedures specific to the sub-object type.

7. A computerized system for managing objects and for implementing a processing procedure on at least one of the objects allocated in each case to an object category, the system comprising:

means for parsing the object into separately processable and hierarchically organized sub-objects that are instances of corresponding sub-object types;

at least one processor that;

processes at least some of the sub-objects with predetermined partial processing procedures that are specific to each sub-object type, wherein attributes of the sub-objects or attributes of other sub-objects are temporarily made available during the predetermined partial processing procedures, the attributes of the other sub-objects being attributes of hierarchically higher ranking sub-objects, combines the results using a functional relationship in a processing procedure of a higher rank than the predetermined partial processing procedures, and derives an object-specific processing result from the processing procedure, wherein the object and the sub-objects of the object are instantiated in one or more databanks and are stored in one or more hierarchically classifiable directories specific to the object or sub-object type, wherein the directory or directories are in each case structured such that a mask of the directory or directories is not specific to the object or one of the sub-objects.

8. The system of claim 7, wherein a control unit generates a temporary storage structure or a non-permanent object type that stores the attributes for the corresponding sub-objects to be processed, in which the attributes are temporarily filed and can be transferred to the corresponding partial processing procedures specific to each sub-object type.

9. The system of claim 8, wherein the temporary storage structure or the non-permanent object type is provided with the attributes that are required for implementing a corresponding partial processing procedure specific to each sub-object type.

10. The system of claim 8, wherein the control unit is configured to automatically make available the attributes according to predefined rules.

11. The system of claim 7, wherein interfaces are provided via which the partial processing procedures specific to the sub-objects are transferred to external processing units.

12. A computer-readable medium comprising programmable instructions for a computer-implemented method that implements a processing procedure on an object allocated to an object category as an instance of an object type in a computer system, the method comprising the steps of:

parsing the object into separately processable, hierarchically classifiable sub-objects as instances of corresponding sub-object types;

processing at least some of the sub-objects with predetermined partial processing procedures specific to each sub-object type, wherein attributes of the sub-objects or attributes of other sub-objects are temporarily made available during the predetermined partial processing procedures, the attributes of the other sub-objects being attributes of hierarchically higher-ranking sub-objects;

processing results obtained from processing the sub-objects, and combining the results using a functional relationship in a processing procedure of a higher rank than the predetermined partial processing procedures; and deriving an object-specific processing result from the processing procedure, wherein the object and the sub-objects of the object are instantiated in one or more databanks of the computer system and are stored in one or more hierarchically classified directories specific to the object type or sub-object type, and further wherein the directory or directories are in each case structured such that a mask of the directory or directories is not specific to the object or one of the sub-objects.

13. The computer-readable medium of claim 12, wherein a temporary storage structure or a non-permanent object type stores the attributes for the corresponding sub-objects to be processed, in which attributes are temporarily filed and transferred to the corresponding partial processing procedures specific to each sub-object type.

14. The computer-readable medium of claim 13, wherein the temporary storage structure or the non-permanent object type is provided with the attributes that are required for carrying out a corresponding partial processing procedure specific to the sub-object type.

15. The computer-readable medium of claim 13, wherein the attributes are automatically made available according to predefined rules implemented in the computer system.

16. The computer-readable medium of claim 12, wherein the partial processing procedures specific to the sub-object types are transferred via an interface to external processing units.

17. The computer-readable medium of claim 12, wherein intermediate processing results of correspondingly subordinate sub-objects are temporarily made available for the implementation of the partial processing procedures specific to the sub-object type.

* * * * *